Dec. 27, 1960

G. H. LEONARD 2,966,667

PRESSURE GRADIENT DETECTOR

Filed June 6, 1945

Inventor
G. H. Leonard

By Ralph L Chappell
Attorney

Dec. 27, 1960

G. H. LEONARD

2,966,667

PRESSURE GRADIENT DETECTOR

Filed June 6, 1945

Inventor
G. H. Leonard
By Ralph L Chappell
Attorney

FIG. 3.

Dec. 27, 1960  G. H. LEONARD  2,966,667
PRESSURE GRADIENT DETECTOR
Filed June 6, 1945  6 Sheets-Sheet 4

Inventor
G. H. Leonard
By Ralph L. Chappell
Attorney

Dec. 27, 1960 G. H. LEONARD 2,966,667
PRESSURE GRADIENT DETECTOR
Filed June 6, 1945 6 Sheets-Sheet 6

FIG. 9.

Inventor
*G. H. Leonard*

By [signature]
Attorney

United States Patent Office 2,966,667
Patented Dec. 27, 1960

2,966,667

PRESSURE GRADIENT DETECTOR

George H. Leonard, 3103 Shepherd St., Mount Rainier, Md.

Filed June 6, 1945, Ser. No. 597,929

13 Claims. (Cl. 340—236)

(Granted under Title 35, U.S. Code (1952), sec. 266)

This invention relates to a pressure gradient detector device for determining the pressure change in water incident to a vessel moving through the water. The device may be used either to indicate the pressure variation along the path of travel of a vessel or to close an electrical circuit and fire a mine for the purpose of destroying the vessel.

A vessel moving through the water displaces a volume of water depending upon the hull shape and draft of the vessel. The displaced water acquires kinetic energy by reason of its mass and velocity and, since the total energy of the water must remain a constant, the kinetic energy is acquired at the expense of a reduction in head of the water beneath the vessel according to Bernoulli's theorem.

An object of the present invention is to provide a pressure detector device which will operate on low pressure differentials, for instance as low as .002 lb. per sq. in.

Another object of the present invention is to provide a pressure gradient detector device which will operate in all gravity positions.

A further object of the present invention is to provide a pressure differential detector device which will operate with no appreciable loss in sensitivity after prolonged periods of idleness.

An additional object of the present invention is to provide a pressure gradient detector device which will be non-responsive to mechanical vibration in the absence of pressure changes.

It is a further object of the present invention to provide a pressure gradient detector device which will be rugged enough to withstand decelerations up to 5,000 ft. per sec.² without change in sensitivity or damage to vital parts.

Still another object of the present invention is to provide a pressure gradient detector device which will be capable of adjustment over a wide range of sensitivities.

It is also an object of the present invention to provide a pressure detector device which can be used to measure the changing pressure conditions existing at depths up to one hundred (100) feet beneath the surface of a large open body of water, these changes being due to the passage through the water of surface (as well as subsurface) vessels in the vicinity of the detector device, as well as changes due to waves and tides.

Other objects, advantages, and improvements will be apparent from the following description taken in connection with the accompanying drawings, in which.

Figure 1:
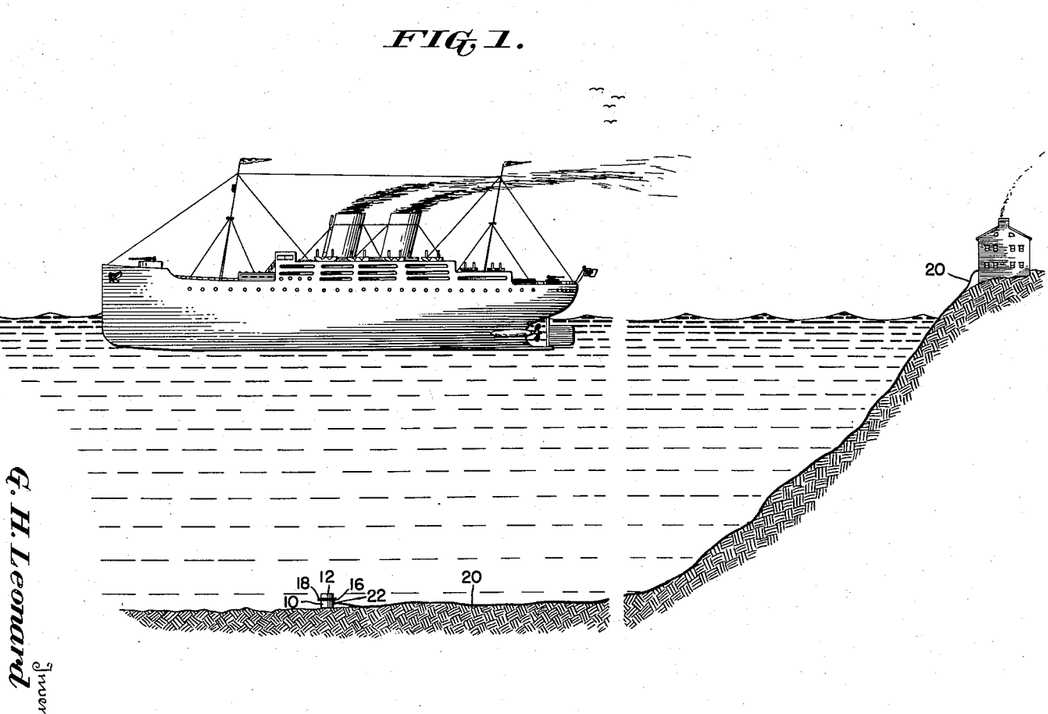
Fig. 1 is a view of the pressure detector device planted on the bed of a body of water and showing a vessel traveling over the device, and an electric cable extending from the detector device to a control station on the shore where means (see Fig. 9) are provided for adjusting the sensitivity of the device.

Referring now to the drawings for a more complete understanding of the invention and more particularly to Fig. 1, this figure shows the pressure detector device, indicated generally by the reference numeral 10 applied to the casing, planted on the bed of a body of water. A cable 20 containing the requisite number of conductors (eight) extends from the pressure detector device to a control station in a building on the shore. A vessel is shown passing over the pressure detector device and the latter is in readiness for determining the pressure signature or gradient of the vessel. Obviously however the pressure detector device is capable of use in the open sea, at a distance from any coast, and in this latter case the cable 20 would extend to a boat anchored at some distance from the site of the submerged pressure detector device.

Figure 2:
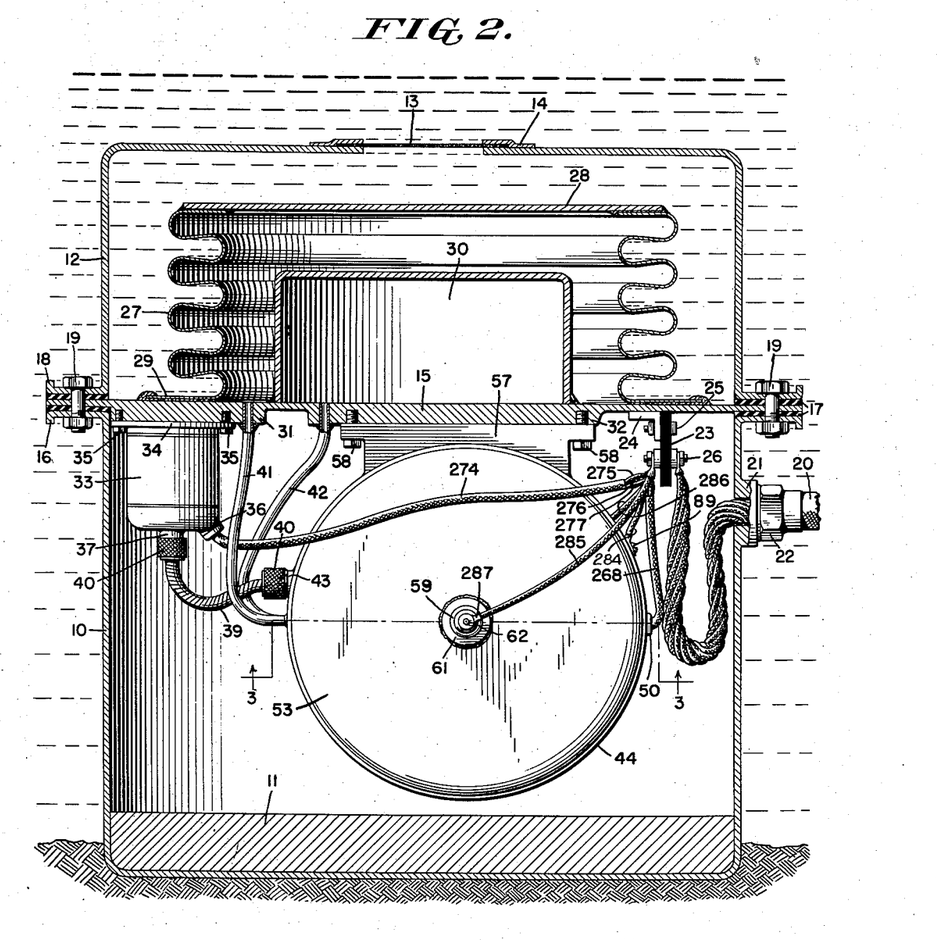
Fig. 2 is a vertical sectional view through the pressure detector device showing in particular the differential bellows and back volume chamber arrangement, the detector device again being shown planted in the water but in this view the relative height of the detector device being greatly exaggerated with respect to the depth of the water in which the device is planted.

As shown in Fig. 2 the pressure detector device is enclosed by a two part casing, the reference numeral 10 designating the lower or main casing section and the reference numeral 12 designating the upper casing section. The two sections 10 and 12 are both cylindrical and of the same diameter differing principally in that the upper section 12 is of lesser height than the depth of the lower section 10. The upper section 12 has a central opening at its top for the admission of water and this opening is covered by a screen 13, this screen being held in place by an annular member 14 which has a depressed central portion to receive the screen and which member is secured to the top of the upper casing section in any suitable manner, as by welding, soldering, brazing, or the like. The lower casing section has secured on its bottom a layer 11 of material of high specific gravity, such as lead, to bias the device to vertical position in planting. At the top of the lower section 10 there is formed a circumferential flange 16 and at the bottom of the upper section 12 there is formed a registering and complementary circumferential flange 18. A partition and supporting plate 15 is gripped between the flanges 16 and 18, identical ring gaskets 17 being placed on either side of the supporting plate and between same and the flanges 16 and 18, respectively. Bolts 19 are arcuately spaced and extend through suitable holes in the flanges 16 and 18, gaskets 17, and the supporting plate 15.

The cable 20 enters the lower casing section 10 through a suitable boss 21 on the side of the latter, a lock nut 22 being provided for securing the cable to the boss thereby forming a watertight gland. The conductors carried by this cable, here shown as eight in number, extend to a terminal block 23 which is mounted on the under side of the supporting plate 15 by an angle bracket 24, the latter having one leg secured to the supporting plate, as by brazing, soldering, welding, or the like, and the other leg having the terminal block 23 secured thereto by stud bolts 25. The conductors are received by binding posts 26 passing through the terminal block. From these binding posts extensions of the conductors are carried to their respective destinations, as will later be described in greater detail.

An expansible bellows 27 is mounted within and concentrically of the upper casing section 12, this bellows having a top plate 28 and a bottom flange 29, the top plate being secured to the bellows and the bottom flange to the supporting plate 15 as by brazing, soldering, welding, or the like. Concentrically of and within the expansible bellows 27 a back volume chamber 30 is mounted, this chamber being in the form of an inverted cup having its periphery secured to the supporting plate 15 as by brazing, soldering, welding, or the like.

The supporting plate 15 has two integral bosses 31 and 32 on its under face, the boss 32 being approximately centrally positioned of the plate and the boss 31 being positioned eccentrically thereof. A reversible series electric motor 33 is secured to the boss 31, this motor functioning to adjust the positions of the restoring means for the detector valve discs, as will later be described. The electric motor 33 has a bottom flange 34 on its casing through which arcuately spaced stud bolts 35 pass to secure the motor to the boss 31. Also, the casing of the motor has a diagonally positioned boss 36 through which a supply cable 274 extends from the terminal block 23 and an axial boss 37 through which a flexible drive 38 (Fig. 3) extends, this drive being secured in a flexible conduit 39 and the conduit being secured at one end to the axial boss 37 by a suitable lock nut 40.

The double vane detector device is mounted in a cylindrical casing 44 which is positioned substantially diametrically of the lower casing section 10. The cylindrical casing 44 has a thick bottom plate 45 and a closure plate 46 of approximately the same thickness, as will be seen from Fig. 3. The top face of the annular wall of the cylindrical casing 44 is recessed from the outer toward the inner circumference to provide a seat 47 for a gasket 48. Stud bolts 49, spaced around the circumference of the closure plate 46, extend through the gasket 48 and into suitably threaded holes in the cylindrical casing 44 for securing the closure plate to the latter. An end cap 53 is positioned over the bottom plate 45, the latter being provided with a shoulder 51 around its circumference for receiving the end cap; similarly, an end cap 54 is positioned over the closure plate 46, the latter being likewise provided with a shoulder 52 around its circumference to receive the end cap, and both end caps being secured to the respective plates as by brazing, soldering, welding or the like.

Figure 3:
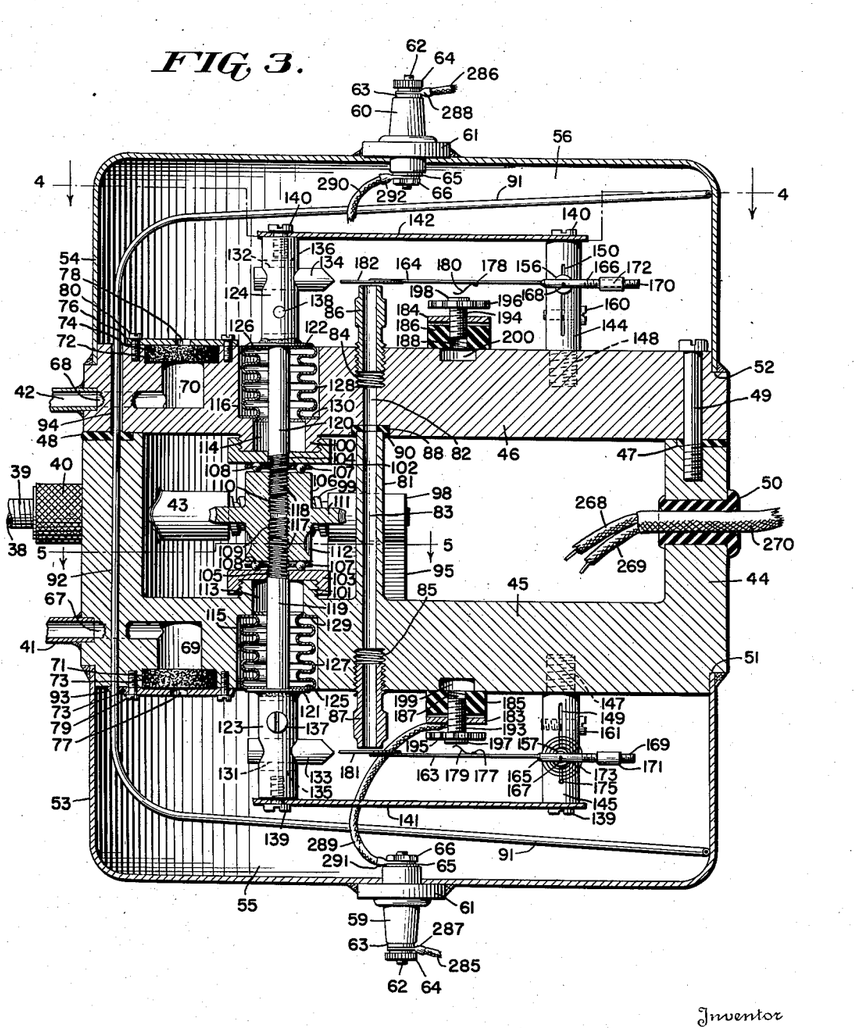
Fig. 3 is a view on the section line 3—3 of Fig. 2 showing in particular the interior of the detector device including the double chambers and the double vanes for measuring both positive and negative incremental changes in the pressure gradient.

The end cap 53 cooperates with the bottom plate 45 of the cylindrical casing to form a fluid reservoir 55 and likewise the end cap 54 cooperates with the closure plate 46 of the cylindrical casing to form a fluid reservoir 56. The cylindrical casing 44 is supported in horizontal position, that is at right angles to the axis of the casing sections 10 and 12, by an integral foot 57 which is secured by stud bolts 58 (Fig. 2) to the boss 32 on the under face of the supporting plate 15. A conduit 41 extends from the interior of the expansible bellows 27 through the boss 31 on the under side of the supporting plate 15 and enters a bore 67 in the bottom plate 45 of the cylindrical casing 44; similarly, a conduit 42 extends from the interior of the back volume chamber 30 through the boss 32 also on the under side of the supporting plate 15 to a bore 68 in the closure plate 46, both conduits being secured in the respective bosses and in the bores in the plates 45 and 46, respectively, as by brazing, soldering, welding, or the like.

In order to carry conductors 285 and 286 from the terminal block 23 through the end caps 53 and 54, respectively, and to their destinations, for the purpose which will appear hereinafter, there are provided insulator bushings 59 and 60 positioned axially of the end caps 53 and 54, respectively, these being designated generally by the reference numerals applied to their bodies. A device known commercially as the "Stupakoff" insulator has been successfully used. Alternatively a small ordinary engine spark plug may be suitably modified and used. As shown here, each device consists of a body 59, or 60, of porcelain, or some other insulating material such as one of the phenolic condensation products, a radially extending metal flange section 61 secured in any suitable manner to the body, and an axially extending electrode rod 62 through the body. The metal flange sections 61 are secured to the end caps 53 and 54, respectively, as by brazing, soldering, welding, or the like. The electrode rods 62 are threaded at both ends and on the outer end of each rod a disc nut 63 and a knurled nut 64 are screwed and on the inner end of each rod a disc nut 65 and a hexagonal nut 66 are screwed. A terminal eye 287 on the conductor 285 from the contact block 23 is secured between the disc nut 63 and the knurled nut 64 and a terminal eye 291 on a continuation conductor 289 is secured between the disc nut 65 and the hexagonal nut 66 on the insulator bushing 59. Similarly, a terminal eye 288 on the conductor 286 from the contact block 23 is secured between the disc nut 63 and the knurled nut 64 and a terminal eye 292 on a continuation conductor 290 is secured between the disc nut 65 and the hexagonal nut 66 on the insulator bushing 60.

The cylindrical casing 44 has a hollow boss 43 which extends chordally of the casing both interiorly and exteriorly at about the mid-section thereof. The flexible conduit 39, carrying the drive 38 from the electric motor 33, is connected to this boss by a second lock nut 40, the drive extending through the boss to the interior of the casing.

It will be recalled that the conduit 41 enters a diametral bore 67 in the bottom plate 45 and the conduit 42 enters a diametral bore 68 in the top plate 46. A bore 69 extends from the outer face of the bottom plate 45 parallel to the axis of the cylindrical casing 44 and intersects the bore 67 at its bottom. Also extending from the outer face of the bottom plate there is a counterbore 71 which forms a recess for receiving a filter 73. A retaining plate 75 with a central aperture 77 therein is provided for securing the filter 73 in place, this retaining plate being in turn secured in place by screws 79 extending through same and into the bottom plate 45. Similarly, a bore 70 extends from the outer face of the top plate 46 parallel to the axis of the cylindrical casing 44 and intersects the bore 68 at its bottom. Also extending from the outer face of the closure plate 46 there is a counterbore 72 which forms a recess for receiving a filter 74. A retaining plate 76 with a central aperture 78 therein is provided for securing the filter 74 in place, this retaining plate being in turn secured in place by screws 80 extending through same and into the closure plate 46.

A valved connection is provided between the fluid reservoir 55 intermediate the bottom plate 45 of the cylindrical casing 44 and the end cap 53 and the fluid reservoir 56 intermediate the closure plate 46 and the end cap 54. This connection consists of an elongated boss 81 which is integrally formed with the bottom plate 45 and extends upwardly slightly beyond the face plane of the annular wall of the cylindrical casing. This boss is positioned adjacent the axis of the cylindrical casing and has a bore 83 therethrough. A threaded counterbore 85 extends from the outer face of the bottom plate 45 and a nipple 87 is fitted therein. The closure plate 46 is provided with a bore 82 which registers with the bore 83 through the elongated boss 81. Similarly, a threaded counterbore 84 extends from the outer face of the closure plate 46 and a nipple or nozzle 86 is fitted therein. Also, a counterbore 88 is formed on the inner face of the closure plate 46 and this counterbore provides a seat for a ring gasket 90 which overlies the top of the hollow boss 81.

A fluid reservoir connection for equalizing the pressures between the fluid reservoirs 55 and 56 over a long time period is also provided. This connection consists of a conduit 91 having a relatively small bore therethrough extending between the reservoirs 55 and 56. The conduit 91 passes through a bore 92 in the annular side wall of the cylindrical casing 44, being in close fitting relationship in this bore, and is secured to the outer face of the bottom plate 45 at the end of this bore as by brazing, soldering, welding, or the like, as at 93, and further passes freely through a registering bore 94 in the closure plate 46.

Figure 4:
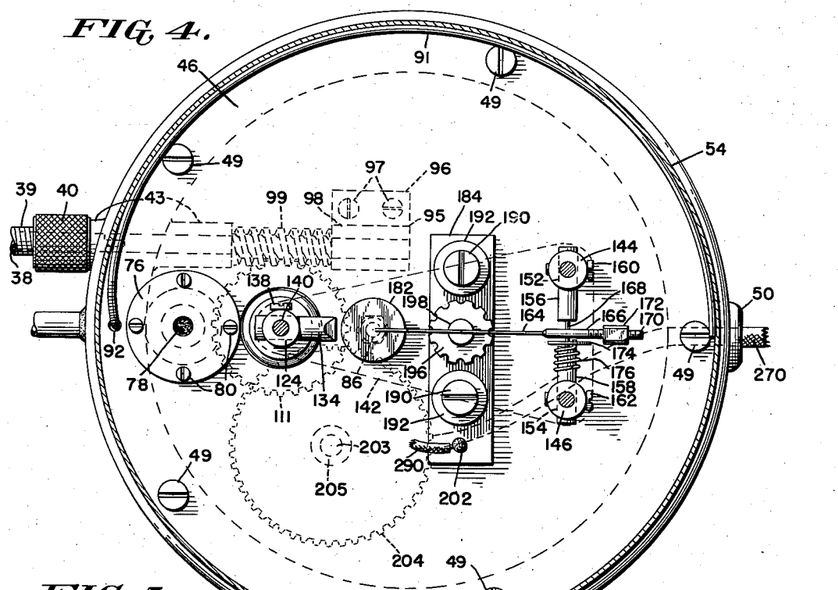
Fig. 4 is a view on the section line 4—4 of Fig. 3 showing in particular one of the vanes and the mounting structure and permanent magnet biasing means therefor.

A hanger 95 has a toe flange 96 through which suitable stud bolts 97 pass to secure the hanger to the bottom plate 45 of the cylindrical casing 44 (Fig. 4). The upper end of the hanger 95 is formed as a hollow boss 98 which is positioned in alignment with the boss 43 chordally of the interior of the cylindrical casing. The flexible drive 38 which extends from the reversible electric motor 33 through the flexible conduit 39 terminates at and is journalled in the boss 98, and a worm 99 is secured on this drive with its end faces abutting the bosses 43 and 98.

On the under surface of the closure plate 46 and on the inner surface of the bottom plate 45 of the cylindrical casing 44 there are formed aligned threaded bosses 100 and 101, respectively, Fig. 3. A screw threaded cap 102 having a central aperture 104 is fitted over the boss 100 and likewise a screw threaded cap 103 having a central aperture 105 is fitted over the boss 101.

A compound gear 106 is positioned between the caps 102 and 103 on the bosses 100 and 101, respectively. Thrust bearings are interposed between the faces of the hub of the compound gear 106 and the end caps 102 and 103, respectively, these bearings being comprised by disc type races 107 each carrying a circumferentially spaced row of ball bearings 108. The hub of the compound gear 106 has an axial bore therethrough, which bore is aligned with the central apertures 104 and 105 in the bearing caps 102 and 103, respectively, and this bore is provided with left hand threads between its mid-section and the lower face of the hub, as at 109, and with right hand threads between its mid-section and the upper face of the hub, as at 110. The compound gear 106 has a radially extending worm gear 111 at its mid-section and a spur gear 112 intermediate the mid-section and the lower face of the hub, for a purpose which will be later described. The worm gear 111 is in mesh with the worm 99 carried by the flexible drive 38.

The boss 101 on the bottom plate 45 of the cylindrical casing 44 has a bore 113 extending therethrough which bore is enlarged by a counterbore 115 extending from the outer face of the bottom plate. Similarly, the boss 100 on the closure plate 46 for the cylindrical casing 44 has a bore 114 extending therethrough which bore is enlarged as at 116 by a counterbore extending from the outer face of the closure plate.

A cylindrical rod 119 has an inner section, which is threaded with left hand threads, as at 117, and an outer enlarged section 123, the threaded section extending through the central aperture 105 in the screw cap 103 and mating with the left hand threads 109 in the lower part of the axial bore of the compound gear 106. The rod 119 may be formed as a reduced portion of the outer section 123, or the outer section may be formed as a sleeve and forcibly fitted over the rod 119. In either event a washer 121 is secured to the shoulder at the juncture of the inner and outer sections 119 and 123, respectively, of the rod as by brazing, soldering, welding, or the like. An expansible bellows 127 forms a fluid tight joint between the cylindrical rod 119—123 and the bottom plate 45 of the cylindrical casing 44. This bellows is positioned in the counterbore 115 in the bottom plate, its bottom flange 129 being secured to the bottom of the counterbore, as by brazing, soldering, welding, or the like, and the cylindrical rod 119 passes through the top 125 of the bellows, the washer 121 on the rod 119—123 being secured to the top 125 of the bellows, again as by brazing, soldering, welding, or the like.

Similarly, a cylindrical rod 120 has an inner section, which is threaded with right hand threads, as at 118, and an outer enlarged section 124, the threaded section extending through the central aperture 104 in the screw cap 102 and mating with the right hand threads 110 in the upper part of the axial bore of the compound gear 106. Again a washer 122 is secured to the shoulder at the juncture of the inner and outer sections 120 and 124, respectively, as by brazing, soldering, welding, or the like. Likewise, an expansible bellows 128 forms a fluid tight joint between the cylindrical rod 120—124 and the closure plate 46 for the cylindrical casing 44. This bellows is positioned in the counterbore 116 in the closure plate, its bottom flange 130 being secured to the bottom of the counterbore, as by brazing, soldering, welding, or the like, and the cylindrical rod 120 passes through the top 126 of the bellows, the washer 122 on the rod 120—124 being secured to the top 126 of the bellows, again as by brazing, soldering, welding, or the like.

The enlarged section 123 of the cylindrical rod 119—123 has a diametrically extending hole 131 therethrough and in this hole there is positioned a cylindrical permanent magnet 133, this magnet having a V-shaped end. The hole 131 is located in such position in the enlarged rod section 123 that the apex of the V-shaped end is approximately in the same plane parallel to the outer face of the bottom plate 45 as the outer end of the nipple 87. The magnet 133 is preferably made of the paramagnetic alloy known commercially as "Alnico," this being an alloy of aluminum, nickel, and cobalt. A slot 135 is formed axially of the enlarged rod section 123 and through the axis of the hole 131, this slot extending axially of the enlarged rod section for some distance on either side of the axis of the hole 131. (The slot 135 is not fully shown but is similar to the axial slot 150 in the post 144, later described.) A diametrically positioned screw 137 is mounted in a suitably threaded hole at right angles to the diametrically extending hole 131 and the slot 135 and this screw may be tightened to compress the sides of the hole and the slot toward each other to secure the magnet 133 firmly in place.

Similarly, the enlarged section 124 of the cylindrical rod 120—124 has a diametrically extending hole 132 therethrough and in this hole there is positioned a cylindrical permanent magnet 134, this magnet likewise having a V-shaped end. The hole 132 is located in such position in the enlarged rod section 124 that the apex of the V-shaped end is approximately in the same plane parallel to the outer face of the bottom plate 45 of the cylindrical casing as the outer end of the nipple 86. The magnet 134 is likewise preferably made of the paramagnetic alloy known commercially as "Alnico." A slot 136 is formed axially of the enlarged rod section 124 for some distance on either side of the axis of the hole 132. A diametrically positioned screw 138 is mounted in a suitably threaded hole at right angles to the diametrically extending hole 132 and the slot 136 and this screw may be tightened to compress the sides of the hole and the slot toward each other to secure the magnet 134 firmly in place.

Referring now to Fig. 4, it will be seen that mounted along a chord perpendicular to and on either side of the diameter of the closure plate 46 through the enlarged rod section 124 and nipple 86, there are two aligned posts 144 and 146. These posts have their lower ends reduced in diameter and suitably threaded, as at 148, whereby they are secured in correspondingly threaded holes in the closure plate 46. A triangular spring plate 142 comprises a means for bracing the cylindrical rod 120—124 and for constraining same to axial movement, this plate being secured at its altitude apex to the enlarged rod section 124 by a screw 140 and at its base apices to the posts 144 and 146 by additional screws 140 and tensioning the cylindrical rod section 119—120 axially. The post 144 has a longitudinal slot 150 which extends axially for about half the length of the post, this slot being approximately equally disposed on either side of the mid-section of the post. Near the upper end of the slot 150 in the post 144 a diametral hole 152 is formed, this hole having its axis on the center line of the slot. A bearing rod 156 is mounted in the hole 152 and a locking screw 160 is positioned diametrically of the post 144 and at right angles to the slot 150 and the hole 152 for compressing the sides of the slot and the hole toward each other to grip firmly the bearing rod. Similarly, the post 146 is provided with a corresponding longitudinal slot (not shown) and a corresponding diametrically positioned hole 154, this hole being aligned with the hole 152 through the post 144, and a diametrically positioned locking screw 162. A bearing rod 158 is mounted in the hole 154 in the post 146 in alignment with the bearing rod 156 carried by the post 144.

A rod shaped lever 164 is mounted along the diameter of the closure plate 46 through the enlarged rod section 124 and the nozzle 86. This lever has an enlarged end section 166 which may be formed integrally with the lever or may be formed separately as a sleeve element and sweated on the lever. Extending transversely through the enlarged end section 166 of the lever there is a pivot shaft 168 which is mounted in aligned axial holes in the bearing rods 156 and 158 carried by the posts 144 and 146, respectively. The enlarged end section 166 of the lever is suitably threaded at 170 and a counterweight 172 is mounted thereon. A hair spring 174 is mounted on the pivot shaft 168 intermediate the enlarged end section 166 of the lever and one of the bearing rods 156 and 158, for instance the latter, the innermost convolution of this hair spring being secured to the shaft 168 in any well known manner. An abutment member 176 is formed as a heavy coil spring mounted on the bearing rod 158 by a force fit. The inner end of this coil spring is bent to axially parallel relationship with the bearing rod 158 and the end of the outermost convolution of the hair spring 174 is secured to this end of the coil spring in any suitable manner, for instance by soldering, as shown in Fig. 4. On the outer end of the lever 164 there is mounted, as by brazing, soldering, welding, or the like, a valve disc 182 which is adapted to oscillate above and to seat on the outer face of the nozzle 86, this valve disc being normally in alignment with the V-shaped end of the magnet 134. Approximately mid-way between the pivot shaft 168 and the valve disc 182 there is mounted on the lever 164 a movable spring contact element 180, for cooperation with a fixed contact element 198, to be later described. The contact element 180 is preferably made of platinum-iridium alloy and secured to the lever 162 either by a screw 178 or by an integral mounting, such as brazing, soldering, welding, or the like.

The structure and mechanism described is duplicated on the under side of the bottom plate 45 of the cylindrical casing 44 wherein the reference numeral 145 designates a post, corresponding to the post 146, this post having its lower end reduced in diameter and suitably threaded at 147, for mounting in a suitably threaded hole in the bottom plate 45, the parallel aligned post corresponding to the post 144 not being shown. A triangular spring bracing plate 141 is secured to the enlarged section 123 of the cylindrical rod 119—123 at its altitude apex by a screw 139 and at one of its base apices to the post 145 by a second screw 139, this plate likewise constraining the cylindrical rod 119—123 to axial movement and imparting an axial tension thereto. The post 145 has a longitudinal slot 149 which extends for about half the length of the post, this slot being approximately equally disposed on either side of the mid-section of the post. Near the lower end of the slot 149 in the post 145 a diametral hole is formed, this hole having its axis on the center line of the slot. A bearing rod 157 is mounted in the diametral hole in the post 145 and a locking screw 161 is positioned in a suitably threaded hole diametrically through the post 143 and at right angles to the slot 149 and the hole for the bearing rod 157, for compressing the sides of the hole and the slot 149 toward each other to grip firmly the bearing rod. It will be understood that the second post (not shown), which is parallel to the post 143 and on the same chord of the bottom plate 45 with same, also has a longitudinal slot, similar to the longitudinal slot 149 in the post 145, a diametral hole, aligned with the diametral hole through the post 145, a bearing rod mounted in the diametral hole, and a locking screw, similar to the locking screw 161, at right angles to the longitudinal slot and the diametral hole, and that a pivot shaft 167 is mounted in the bearing rod 157 carried by the post 145 and the aligned bearing rod carried by the second parallel post.

A rod shaped lever 163 is mounted along the diameter of the bottom plate 45 through the enlarged rod section 123 and the nozzle 87. The lever 163 has an enlarged end section 165 and the shaft 167 passes transversely through this enlarged end section. A counterweight 171 is mounted on a suitably threaded portion 169 of the enlarged end section 165 of the lever. Intermediate the enlarged end section and the bearing rod 157 carried by the post 145 a hair spring 173 is mounted on the pivot shaft 167, the innermost convolution of this spring being secured to the shaft 167. An abutment member 175 is formed as a heavy coil spring mounted on the bearing rod (not shown) carried by the post (not shown) that is aligned with the post 145, by a force fit on the bearing rod. The inner end of this coil spring is bent to axially parallel relationship with the bearing rod and the end of the outermost convolution of the hair spring 173 is secured to this end of the coil spring in any suitable manner as by soldering. On the outer end of the lever 163 there is mounted, as by brazing, soldering, welding, or the like, a valve disc 181 which is adapted to oscillate above and to seat on the outer face of the nozzle 87, this valve disc being normally in alignment with the V-shaped end of the magnet 133. Approximately midway between the pivot shaft 167 and the valve disc 181 there is mounted on the lever a movable contact spring 179, for cooperation with the fixed contact element 197, to be later described. The contact spring 179 is likewise preferably made of platinum-iridium alloy and secured to the lever 163 either by a screw 177 or by an integral mounting, such as brazing, soldering, welding, or the like.

Approximately mid-way between the enlarged rod section 124 and the post 144, and below the contact spring 180 on the lever 164, a fixed contact device is mounted on the top plate 46 for the cylindrical casing 44. This device consists of a rectangular plate 184 mounted at right angles to the lever 164, this plate resting on an insulating block 186 of the same general shape. The insulating block 186 is made of "Bakelite" or any of the other well known phenolic condensation products having a dimensionally stable characteristic.

Screws 190 with washers 192 positioned under their heads extend through the plate 184 and the insulating block 186 and into suitably threaded holes in the closure plate 46 for securing the plate 184 and the insulating block 186 in position. At the center of the plate 184 and the insulating block 186 there is mounted a fixed contact element, this element consisting of a screw threaded shank 194, a grooved head 196, and a platinum-iridium contact disc 198 concentric with the head 196 and shank 194 and secured to the latter. The threaded shank 194 extends through a suitably threaded hole in the plate 184 and an aligned hole 188 in the insulating block 186. The hole 188 in the insulating block 186 is threaded to receive threaded shank 194. Upon assembly, threaded shank 194 is screwed into both plate 184 and insulating block 186, so that a small gap occurs between the plate 184 and insulating block 186. When screws 190 are tightened, plate 184 is caused to bow in an effort to close the gap mentioned above, thus friction jamming threaded shank 194. The face of the closure plate 46 is provided with a recess 200 in registry with the hole 188 in the insulating block 186 so as to provide clearance for the shank 194 when the fixed contact element 198 is screwed all the way down.

The structure described above is duplicated on the outer face of the bottom plate 45 of the cylindrical casing 44 where the reference numeral 183 designates the rectangular plate, mounted at right angles to the lever 163, 185 the block of insulating material, with screws and washers (not shown) for holding the rectangular plate 183 and block of insulating material 185 in place on the bottom plate 45. A fixed contact element is mounted at the center of the plate 183 and the insulating block 185, this element consisting of a screw threaded shank 193, a grooved head 195, and a platinum-iridium contact disc 197 concentric with the grooved head 195 and the threaded shank 193 and secured to the latter. The threaded shank 193 extends through a suitably threaded hole in the plate 183 and an aligned hole 187 in the insulating block 185. The hole 187 in the insulating block 185 is threaded to receive threaded shank 193. Upon assembly, threaded shank 193 is screwed in both insulating block 185 and plate 183 so that a small gap occurs between the plate 183 and insulating block 185. When the screws holding plate 183 are tightened, plate 183 is caused to bow in an effort to close the gap mentioned above, thus friction-jamming threaded shank 193. The outer face of the bottom plate 45 is provided with a recess 199 in registry with the hole 187 in the insulating block 185 so as to provide clearance for the shank 193 when the fixed contact element 197 is screwed all the way down.

Figure 5:
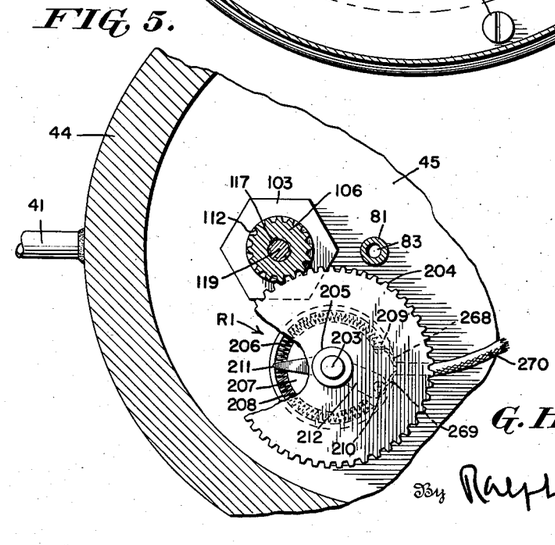
Fig. 5 is a view on the section line 5—5 of Fig. 3 showing in particular the adjusting means for setting the permanent biasing magnets.

As shown in Figs. 4 and 5 an automatic setting means is provided for a rheostat R1. The spur gear 112 of the compound gear 106 is in mesh with a larger diameter spur gear 204 which is mounted on a shaft 203 journalled in any suitable manner (not shown) in the bottom plate 45 and the closure plate 46 for the cylindrical casing 44. A disc 205 is mounted on the shaft 203 in any suitable manner, as by a driving fit, to secure the gear 204 against axial movement on the shaft. A resistance coil 206 is formed as a spiral spring and then bent to toroidal shape and mounted in a suitbale circumferential groove 208 in an insulating plate 207, this coil having screw terminals 209 and 210 at its respective ends. An arm 211 is mounted on the shaft 203 in any suitable manner, as by a driving fit, and rides over the coil 206 and a link 212 electrically connects the arm 211 to the screw terminal 210 of the resistance coil 206.

Figure 6:
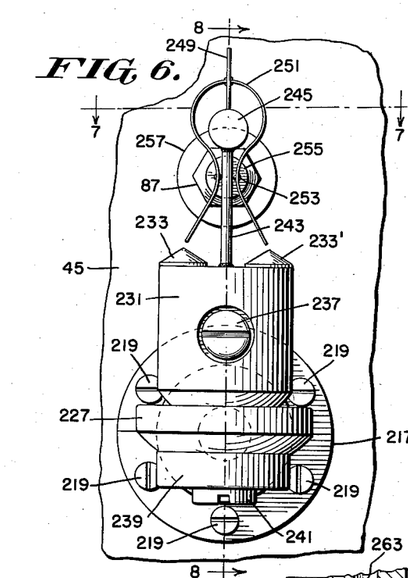
Fig. 6 is a view of a modification as to the magnetic biasing means and the mounting means for one of the detector vanes.
Figure 7:
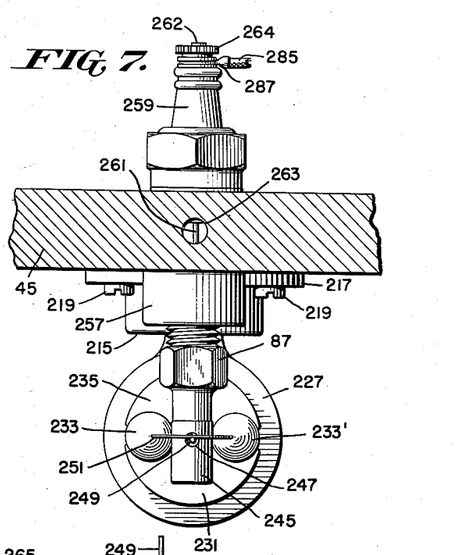
Fig. 7 is an end view on the line 7—7 of Fig. 6 showing in particular the spark plug type fixed contact.
Figure 8:
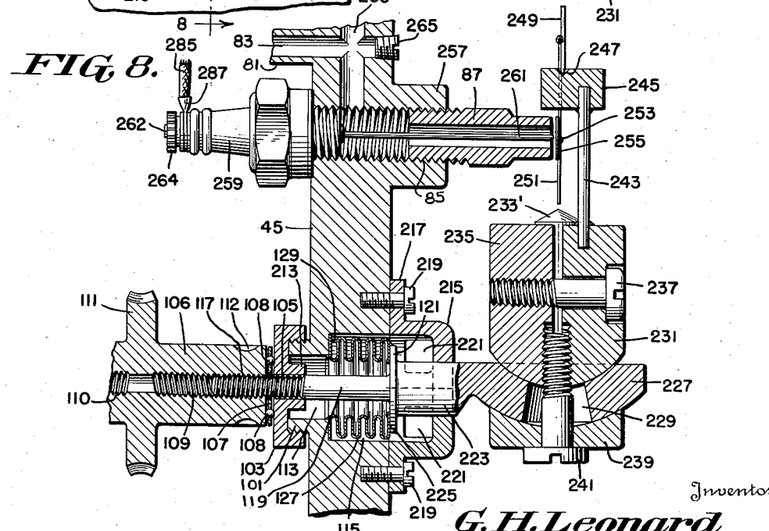
Fig. 8 is a view on the section line 8—8 of Fig. 6 showing in particular the means for mounting and adjusting the permanent biasing magnets.

In the modification of Figs. 6, 7, and 8, a mounting is provided whereby the valve disc may be made to seat perfectly against the face of the nozzle, and an ordinary spark plug may be used for the fixed contact device, with very slight modification. The compound gear 106 again has a worm gear 111 at its mid-section and a spur gear 112 intermediate the mid-section and the lower face, and an axial bore with left hand threads 109 between the mid-section and the lower face and right hand threads 110 between the mid-section and the upper face. A thrust bearing consisting of a circumferential row of balls 108 held in a race 107 is interposed between the lower face of the compound gear 106 and the threaded cap 103 which is mounted on the boss 101 on the bottom plate 45 of the cylindrical casing 44. The cylindrical rod 119 has left hand threads 117 on its inner end which end extends through the central aperture 105 in the bearing cap 103, the threads 117 mating with the left hand threads 109 in the axial bore of the compound gear 106.

In this modification, the spring bracing plate 141 is not present and bearing means are provided for the cylindrical rod 119. This bearing means comprises in part an integral boss 213 on the under face of the threaded cap 103 through which the bore 105 also extends, the cylindrical rod 119 being received in this bore in close fitting relationship. The outer enlarged section of the cylindrical rod 119 is formed with a cylindrical mid-portion 223 and an end portion 227 having a concave bearing surface on its inner face and a concentric convex bearing surface on its outer face, and a frusto-conical hole 229 between the faces. As before, the outer enlarged section 223 may be formed integrally with the cylindrical rod 119 or as a separate part with an axial threaded hole therein into which the outer end of the cylindrical rod 119, also suitably threaded, is fitted. In either event, the washer 121 is again secured at the juncture of the cylindrical rod 119 and the cylindrical mid-portion 223, as by brazing, soldering, welding, or the like. The boss 101 on the bottom plate 45, again has a bore 113 therethrough, which bore is enlarged by a counterbore 115 extending from the outer face of the bottom plate 45. The bellows 127 has its bottom flange 129 secured to the bottom of the counterbore 115 as by brazing, soldering, welding, or the like. Also in this modification, the bellows 127 does not have a complete top but in lieu thereof an inwardly turned flange 225 which is secured to the washer 121 as by brazing, soldering, welding, or the like.

A cap 215 is secured to the bottom plate 45, this cap having at its bottom a circumferential flange 217 through which screws 219 extend into suitably threaded holes in the bottom plate 45. The cap 215 also forms part of the bearing means for the cylindrical rod 119, this cap having a central aperture through which the cylindrical mid-portion 223 of the outer enlarged section of the cylindrical rod 119 passes in close fitting relationship. The cap 215 has apertures 221 in its side walls which relieve pressure on the inside of the cap as the cylindrical rod 119—223 is reciprocated and the bellows 127 expanded and contracted.

A pair of cylindrical permanent magnets 233—233', each having its inner end of conical shape and the said inner ends being of opposite polarities, and held between two semi-cylindrical blocks 231 and 235, the magnets being received in complementary pairs of semi-cylindrical grooves in the inner faces of the blocks. A holding screw 237 passes through a diametral hole in the blocks 235 and 237 intermediate the cylindrical magnets 233—233', this hole being threaded in the block 235 to receive the end of the screw and counterbored on the outer surface of the block 231 to receive the head of the screw, and serves to hold the magnets 233—233' firmly in place. The blocks 231 and 235 have their combined inner ends of spherical shape and of the same radius as the concave surface on the end portion 227 of the enlarged rod section 223. A retaining plate 239 has its inner face formed as a concave spherical surface of the same radius of curvature as the convex spherical surface on the outer end portion 227 of the enlarged rod section 223. A bolt 241 passes freely through a central aperture in the retaining plate 239 and the frusto-conical hole 229 in the end portion 227 of the enlarged rod section 223, and into a threaded hole in the blocks 231 and 235 having its axis on the plane of separation of the blocks.

The threaded bore 85 through the bottom plate 45 for the nozzle 87 in this modification is displaced from the boss 81 and the bore 83 therethrough, both bores extending through the bottom plate 45 in parallel relationship and being connected by a bore 263 in the bottom plate in parallel relationship with the face planes of the latter. The bore 83 through the bottom plate 45 is threaded adjacent the outer face of the plate and closed by a screw plug 265. An ordinary spark plug 259, such, for example, as is commonly used in model internal combustion engines, is fitted in the threaded bore 85 from the inner face of the bottom plate 45. A boss 257 is integrally formed on the outer face of the bottom plate 45 concentric with respect to the bore 85 and this bore passes through the boss, receiving the nozzle 87 in its lower end. The outer face of the nozzle 87 is disposed in a plane parallel to the bottom plate 45 and just inwardly of the axes of the cylindrical magnets 233—233′. A platinum-iridium rod 261 is secured to the electrode rod 262 of the spark plug 259, as by soldering, the outer end of the rod 261 being flush with the face of the nozzle 87. Since the spark plug 259, together with the companion spark plug (not shown) on the inner face of the closure plate 46 are, in this modification, mounted on the inside of the cylindrical casing 44, it will be understood that the conductor 285 connected to the spark plug 259 and the conductor (not shown) connected to the companion spark plug pass through the grommet 50 in the side wall of the cylindrical casing 44, together with the conductors 268 and 269, extending to the rheostat R1 as later described.

A rod 243 is mounted in a suitable hole in the lower block 231, as by a force fit, and this rod at its outer end mounts a silver cylinder 245, the rod extending into a suitable diametral hole in the cylinder, again by a force fit, the junctures of the rod with the block and the cylinder both being additionally secured by soldering. Aligned in the same plane parallel to the bottom plate 45 with the axis of the cylindrical magnets 233—233′ there is formed on the opposite surface of the cylinder 245 a conical indentation 247.

An armature 251 is formed of soft iron wire and of generally hairpin shape but with the prongs of the hairpin bowed inwardly and having the distance between the ends of the prongs equal to the distance between the axes of the cylindrical magnets 233—233′. Along the axis of the hairpin, there is secured to the hump a pivot pin 249, as by soldering, this pin being preferably made of platinum-iridium alloy and having a conical point which is adapted to seat in the conical indentation 247 in the cylinder 245. The inwardly bowed sides of the hairpin armature 251 are secured, as by soldering at 253, to a valve disc and contact element 255 which is positioned closely adjacent and parallel to the outer face of the nozzle 87. The disc 255 is adapted to seat on the outer face of the nozzle 87, closing the passage through the bore thereof, and to contact simultaneously the electrode rod extension 261 of the spark plug 259 to complete an electrical circuit, later to be described. Since the disc 255 is a contact element, as well as a valve member, it is made of platinum-iridium alloy.

The hairpin armature 251 and the valve disc 255 are held in place solely by the action of the lines of force from the magnets 233—233′ on the prongs of the armature. It will be apparent that by means of the spherical surfaces on the blocks 231 and 235, the end portion 227 of the enlarged rod section 223, and the retaining plate 239, and the frusto-conical hole 229 through the end portion 227 for the bolt 241, the magnets 233—233′ can be adjusted to any desired position so that the armature and valve assembly 249—251—255 will be held in stable equilibrium and the valve disc 255 will seat perfectly against the outer face of the nozzle 87. In making the armature and valve disc assembly 249—251—255, the conical pivot pin 249 and the valve disc 255 are first secured to the hairpin armature 251 and then the outer end of the pivot pin is ground away until the center of gravity of the entire assembly is at the inner conical end of the pivot pin.

It will be understood that the structure described above and illustrated in Figs. 6, 7, and 8 is duplicated on the closure plate 46.

Figure 9:
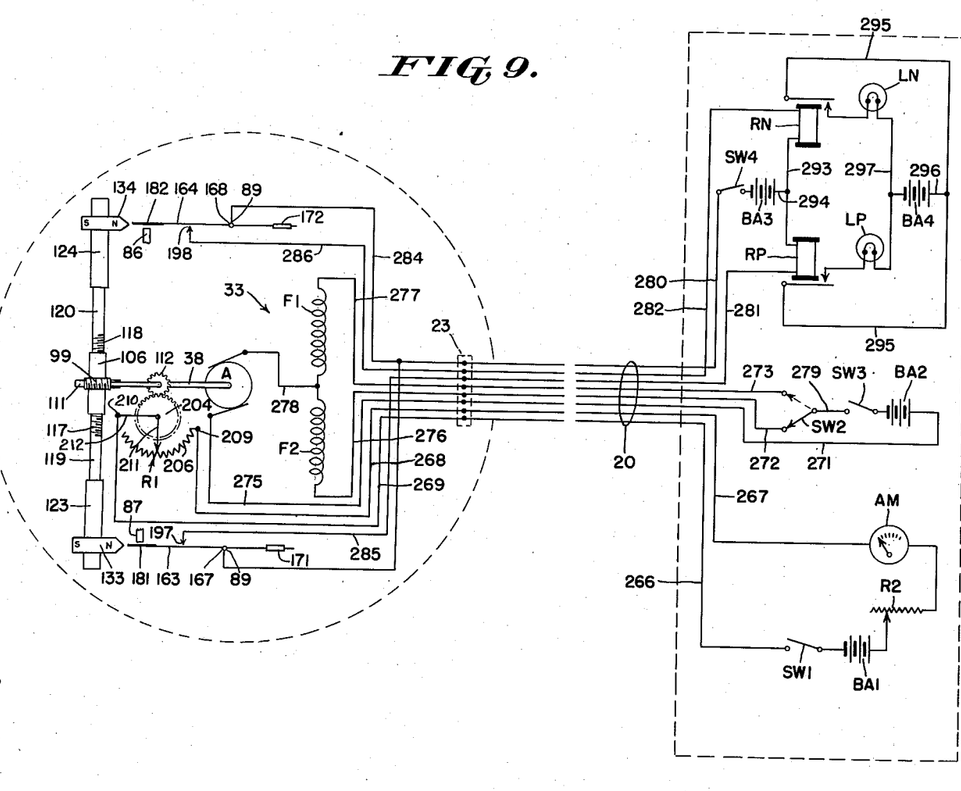
Fig. 9 is a circuit diagram showing in particular the circuit making and breaking devices, which are responsive to the incremental changes in the positive and negative pressure gradients, the reversible electric motor for setting the positions of the permanent biasing magnets, the rheostat which controls the circuit for indicating or calibrating the positions of the permanent biasing magnets, and the internal apparatus in the control house including the meter for calibrating the positions of the permanent biasing magnets, the energizing and reversing means for the electric motor, and the visual indicating means for showing the incremental changes in the positive and negative pressure gradients.

Fig. 9 shows an electrical circuit arrangement suitable for use in connection with the pressure gradient detector device, the latter being illustrated schematically in this figure. The rheostat R1 functions as a calibrating or control means to determine the relative positions of the center lines of the permanent magnets 133 and 134 with respect to the face planes of the nozzles 87 and 86, respectively. It will be recalled that these magnets are carried by the outer enlarged sections 123 and 124 of the cylindrical rods 119 and 120, respectively, and that these rods are in turn mounted in the bore of the compound gear 106 by differential threading 109—117 and 110—118, respectively, and that the compound gear 106 may be driven in either direction by the electric motor 33 through the flexible drive 38 and worm gearing 99—111. The heights of the center lines of the magnets 133 and 134 above the face planes of the nozzles 87 and 86, respectively, determine the normal rest positions of the valve discs 181 and 182, respectively, and hence the pressure gradient required for one or the other of these discs to seat on the face of the respective nozzle in response to fluid flow through the bore 83 in the elongated boss 81, as will be later described. This time period is the same as that required for the movable contact spring element 179 to seat on the contact disc 197 or the movable contact spring element 180 to seat on the contact disc 198, as the case may be, and hence is the measure of the sensitivity of the device as a pressure gradient controlled circuit making and breaking apparatus. It will also be recalled that the spur gear 112 on the compound gear 106 drives the spur gear 204 on the shaft 203 which carries the arm 211 of the rheostat R1. Hence the angular position of the arm 211 at any given time is a function of the positions of the center lines of the magnets 133 and 134 with respect to the face planes of the nozzles 87 and 86, respectively.

A calibrating circuit is provided which comprises two conductors 266 and 267 carried by the cable 20 from the control house, or boat, as the case may be, and extending to the terminal block 23 carried by the supporting plate 15 (Fig. 2). A cable 270 extends from the binding posts 26—26 on the terminal block 23 through the grommet 50 in the side wall of the cylindrical casing 44. The cable 270 carries two conductors 268 and 269, the conductor 268 being an extension of the conductor 267 and connected to the terminal 209 of the coil 206 of rheostat R1, and the conductor 269 being an extension of the conductor 266 and connected to the terminal 210 and through the link 212 to the arm 211 of the rheostat R1. The conductor 266 extends to the arm of a rheostat R2 in the control station, a switch SW1 and a battery BA1 being interposed successively in series in the conductor adjacent the rheostat; likewise, the conductor 267 extends to the resistance coil of the rheostat R2, an ammeter AM being interposed in the conductor adjacent the rheostat. The meter AM may be calibrated in any suitable manner to indicate any desired units of pressure gradient occuring at the detecting device, or, if desired, may be calibrated in amperes in the usual manner, or in degrees to indicate the angular position of the arm 211 of the rheostat R1, or in millimeters to indicate the positions of the center lines of the magnets 133 and 134 with respect to the face planes of the nozzles 87 and 86, respectively. The rheostat R2 compensates for decline in the electromotive force of the battery BA1 due to aging and for variable lengths of the conductors 266 and 267 that may be used.

The reversible electric motor 33 has an armature A and two fields F1 and F2 which may be selectively energized to cause the armature A to rotate in either direction. A terminal of the field coil F1 and a terminal of the field coil F2 are connected together and the junction is connected to one brush of the motor 33 by a conductor 278. A dual energizing circuit is provided for the motor 33, this circuit comprising three conductors 271, 272, and 273 carried by the cable 20 from the control house, or the boat, as the case may be, and extending to the binding posts 26—26—26 on the terminal 23 mounted by the supporting plate 15 (Fig. 2). A cable 274 extends from the binding posts 26—26—26 (Fig. 2) on the terminal block 23 through the diagonal boss 36 on the casing of the electric motor 33. The cable 274 carries three conductors 275, 276, and 277, the conductor 275 being an extension of the conductor 271, the conductor 276 being an extension of the conductor 272, and the conductor 277 being an extension of the conductor 273. The conductor 275 extends to the other brush of the electric motor 33 and the conductor 271 extends to a battery BA2 in the control house; the conductor 276 extends to the other terminal of the field coil F2 and the conductor 272 extends to one contact of a single pole-double throw switch SW2 in the control house; similarly, the conductor 277 extends to the other terminal of the field coil F1 and the conductor 273 extends to the second contact of the single pole-double throw switch SW2. A conductor 279 with a switch SW3 interposed therein connects the arm of the single pole-double throw switch SW2 to the battery BA2. It will be apparent that the motor 33 will be energized when the switch SW3 is closed and will run in either direction according to whether the field coil F1 or the field coil F2 will be energized, that is according to the contact on which the arm of the single pole-double throw switch SW2 is closed.

The circuit which the pressure gradient detector device controls is here shown as a dual lamp indicator circuit but it should be obvious that a mine firing circuit could as well be controlled. This circuit likewise comprises three conductors 280, 281, and 282 carried by the cable 20 and extending from the control house, or the boat as the case may be, to the binding posts 26—26—26 on the terminal block 23 mounted by the supporting plate 15 (Fig. 2). At the control house the conductor 280 is connected to a switch SW4 and a battery BA3 in series. Two relays RN and RP have their windings connected in series by a conductor 293 and a conductor 294 connects the battery BA3 to the conductor 293. The conductor 281 is connected to the other side of the winding of the relay RP. The armatures of the relays RN and RP are connected together by a conductor 295. Similarly, the contacts of these relays are connected together by a conductor 297, two indicating lamps LN and LP being interposed in this conductor. A conductor 296 with a battery BA4 therein connects the conductor 295 to the conductor 297 at a point intermediate the indicating lamps LN and LP.

A conductor 286 extends from one of the binding posts 26 on the terminal block 23 secured to the supporting plate 15 (Fig. 2) to a ground connection at 89 (Fig. 2) on the cylindrical casing 44, this conductor being an extension of the conductor 280. A second conductor 285 extends from one of the binding posts 26 on the terminal block 23 to the insulator bushing 59 in the end cap 53 on the cylindrical casing 44, this conductor being an extension of the conductor 281; the conductor 285 has a terminal eye 287 on its end which is secured between the disc nut 63 and the knurled nut 64 on the insulator bushing 59 (Fig. 3). A continuation conductor 289 on the inside of the end cap 53 has a terminal eye 291 on one end which is secured between the disc nut 65 and the hexagonal nut 66 on the insulator bushing 59, and this conductor is secured at its other end to the rectangular plate 183 which mounts the fixed contact disc 197, as by soldering (not shown). Similarly, a third conductor 286 extends from one of the binding posts 26 on the terminal block 23 to the insulator bushing 60 in the end cap 54 on the cylindrical casing 44, this conductor being an extension of the conductor 282. The conductor 286 has a terminal eye 288 on its outer end which is secured between the disc nut 63 and the knurled nut 64 on the insulator bushing 60. A continuation conductor 290 on the inside of the end cap 54 has a terminal eye 292 which is secured between the disc nut 65 and the hexagonal nut 66 on the insulator bushing 60, and this conductor is secured at its other end to the rectangular plate 184 which mounts the fixed contact disc 198, as by soldering at 202.

In the modification of Figs. 6, 7, and 8 the conductors 285 and 286 (Figs. 2 and 9) extend directly from the binding posts 26—26 on the terminal block 23 to the spark plug 259 in the bottom plate 45 and the complementary spark plug (not shown) in the closure plate 46, respectively, these conductors passing through the grommet 50, Fig. 3, in the side wall of the cylindrical casing 44, together with the conductors 268 and 269 extending to the rheostat R1.

When the pressure gradient detector device is assembled, various adjustments of the circuit making and breaking apparatus are made. Before the cylindrical magnets 133 and 134 are mounted in position in the holes 131 and 132 in the enlarged rod sections 123 and 124, respectively, the levers 163 and 164 are adjusted for balance by screwing the threaded counterweights 171 and 172 along the enlarged threaded end sections 165 and 166, respectively, of the levers. The contact gap adjustment is made by screwing the grooved heads 195 and 196 of the screws 193 and 194, respectively, into or out of the rectangular plates 183 or 184, respectively. The valve gap adjustment is determined by the extent to which the threaded ends 117 and 118 of the cylindrical rods 119 and 120 are initially screwed into the compound gear 106, this setting determining the initial position of the center lines of the cylindrical magnets 133 and 134 with respect to the face planes of the nozzles 87 and 86, respectively. At the same time the arm 211 of the rheostat R1 is set in a predetermined position with respect to the positions of the center lines of the cylindrical magnets 133 and 134 above the face planes of the nozzles 87 and 86, respectively.

The operation of the pressure gradient detector device is as follows: The fluid system of the device is preferably filled with an inert gas such, for example, as nitrogen and the device is planted on the bed of a body of water and the control cable 20 extended to the control house on the shore, or to a suitable boat anchored in the water if measurements are to be made in the open sea at some distance from any shore. When the device is planted in the water at the given depth the bellows 27 will be compressed and the entrained gas will be driven therefrom through the conduit 41, bores 67 and 69 in the bottom plate 45 of the cylindrical casing 44 and into the fluid pressure reservoir 55. The pressure within the bellows 27, the fluid reservoirs 55 and 56, and the back volume chamber 30 will in time be equalized by gas flow through the equalizer connection 91 extending between the reservoirs.

The meter AM is first calibrated by closing the switch SW1, Fig. 9, and setting the rheostat R2 to compensate for the instant battery voltage and the length of the cable 20. Then by closing the switch SW3 and the switch SW2 on one or the other of its contacts, the motor 33 will be operated and through the flexible drive 38 and worm gearing 99—111 will rotate the compound gear 106 to move inwardly or outwardly the cylindrical rods 119—123 and 120—124 and the cylindrical magnets 133 and 134, respectively, carried thereby. As previously stated, the positions of the center lines of the magnets 133 and 134 with respect to the face planes of the nozzles 87 and 86, respectively, determine the initial rest positions of the valve discs 181 and 182, respectively. The expansible bellows 127 and 128 permit reciprocation of the cylindrical rods 119 and 120, respectively, but prevent any leakage of gas from the fluid reservoirs 55 and 56, respectively, into the bores 113 and 114 in the bosses 101 and 100, on the bottom plate 45 and the closure plate 46, respectively.

A vessel moving through the water will develop a pressure wave which will have both positive and negative portions. On the positive portion of the wave the pressure will be increased inside the upper casing section 12, the water entering through the screen 13 which keeps out marine life and growths. The bellows 27 will be further compressed by the increased pressure and the entrained fluid will again be forced through the conduit 41, bores 67 and 69 in the bottom plate 45 of the cylindrical casing, filter 73 and into the fluid pressure reservoir 55. The gas under pressure in the fluid reservoir 55 will attempt to escape through the conduit comprised by the bore of nozzle 87, the bore 83 through the elongated boss 81, the bore 82 through the closure plate 46, and the bore of nozzle 86, and in doing so will force the valve disc 181 to seat on the face of the nozzle 87, the lever 163 being oscillated against the biasing forces exerted by the cylindrical magnet 133 and the hairspring 173; at the same time the valve disc 182 will be forced outwardly, likewise against the biasing actions of the cylindrical magnet 134 and the hairspring 174. The oscillation of the lever 163 toward seating position of the valve disc 181 on the face plane of the nozzle 87 will bring the spring contact element 179 carried thereby into engagement with the fixed contact disc 197 mounted on the rectangular plate 183. Assuming that the switch SW4 in the control house has been closed, a control circuit will now be closed from battery BA3, winding of relay RP, conductor 281, fixed contact disc 197, contact spring element 179, lever 163, ground connection 89, conductor 280, and switch SW4, to battery BA3. The relay RP will be energized and its armature will close a local circuit through conductor 295, conductor 296, battery BA4, conductor 297, and indicator lamp LP, which lamp will be lighted to indicate that the portion of the pressure wave now impinging upon the bellows 27 is positive.

The control and local circuits just described will remain closed until the lever 163 returns to normal position thereby separating the contact spring element 179 from the fixed contact disc 197. This will occur when the positive pressure in the fluid reservoir 55 has been reduced to normal by the attenuation of the positive portion of the pressure wave impinging upon the bellows 27. The bellows 27 will expand as the positive portion of the pressure wave impinging thereon attenuates and the gas will flow from the fluid reservoir 55 through the filter 73, bores 69 and 67 in the bottom plate 45 of the cylindrical casing 44, conduit 41, and into the bellows 27. The gas pressure in the bellows 27 and the fluid reservoir 55 will become equalized, as will also the gas pressure in the fluid reservoir 56, due to the equalizer connection 91, and the lever 163 will be returned to normal position by the biasing action of the cylindrical magnet 133 and the hairspring 173. As the lever 163 is returned to normal position the control circuit for the relay RP will be broken as the contact spring element 179 is separated from the fixed contact disc 197. The relay RP will then release its armature and the local circuit for the indicator lamp LP will be broken and the lamp extinguished.

When the bellows 27 is subjected to the negative portion of a pressure wave, the bellows will expand and gas will be drawn from the fluid reservoir 55 through the filter 73, bores 69 and 67 in the bottom plate 45 of the cylindrical casing 44, and conduit 41. Gas will tend to flow from the fluid reservoir 56 through the conduit comprised by the bore through the nozzle 86, bore 82 through the closure plate 45, bore 83 in the elongated boss 81, the bore through the nozzle 87, and into the fluid reservoir 55, replacement gas coming from back volume chamber 30 through conduit 42, bores 68 and 70 and filter 74 in the closure plate 46. The flow of the fluid from the fluid reservoir 56 through the conduit comprised by the bore through the nozzle 86, bore 82 in the closure plate 46, bore 83 in the elongated boss 81, and the bore in nozzle 87 will force the valve disc 182 to seat on the face of the nozzle 86, the lever 164 being oscillated against the biasing forces exerted by the cylindrical magnet 134 and the hairspring 174. The oscillation of the lever 164 to the position where the valve disc 182 is seated on the face of the nozzle 86 will bring the contact spring element 180 carried by this lever into contact with the fixed contact disc 198. Assuming again that the switch SW4 in the control house has been closed, a control circuit for the relay RN will be closed from the battery BA3 through conductor 294, conductor 293, winding of the relay RN, conductor 282, fixed contact disc 198, contact spring element 180, lever 164, ground connection 89, conductor 284, conductor 280, and switch SW4 to battery BA3. The relay RN will be energized and its armature will close a local circuit through conductor 295, conductor 296, battery BA4, conductor 297, and indicator lamp LN, which lamp will be lighted to indicate that the portion of the pressure wave enveloping the bellows 27 is negative.

The control and local circuits of the relay RN just described will remain closed until the lever 164 returns to normal position thereby separating the contact spring element 180 from the fixed contact disc 198. This will occur when the pressure in the fluid reservoir 56 has returned to normal by the decreasing amplitude of the negative portion of the pressure wave enveloping the bellows 27. As the negative portion of the pressure wave decreases in amplitude, the bellows 27 will contract and air will be forced through the conduit 41, bores 67 and 69 and the filter 73 in the bottom plate 45 of the cylindrical casing 44, and into the fluid reservoir 55. Again the fluid pressure in the bellows 27 and in the fluid reservoir 55 will become equalized, as will also the fluid pressure in the fluid reservoir 56 due to the equalizer connection 91 between the reservoirs, and the lever 164 will be returned to normal position by the biasing actions of the cylindrical magnet 134 and the hairspring 174. As the lever 164 is returned to normal position, the control circuit for the relay RP will be broken due to the separation of the contact spring element 180 carried by the lever from the fixed contact disc 198. The relay RN will then release its armature and the local circuit for the indicator lamp LN will be broken and the lamp extinguished.

While there is here shown and described a certain preferred embodiment of the invention which gives satisfactory results, many other and varied forms and uses will present themselves to those versed in the art without departing from the spirit of the invention, and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a pressure gradient detector device, a variable volume means having a quantity of fluid therein and responsive to a pressure wave, an initially open conduit connected to the variable volume means, a movable member in communication with said fluid and arranged to close the conduits in response to the fluid flow therethrough, and a circuit making and breaking apparatus connected to the movable member.

2. In a pressure gradient responsive device, a variable volume means having a quantity of fluid therein and responsive to a pressure wave, a fixed volume means, an initially open conduit connecting the variable and fixed volume means, a movable member in communication with said fluid and arranged to close said conduit in response to fluid flow therethrough, and circuit making and breaking apparatus connected to the movable member.

3. In a pressure gradient responsive device, a variable volume means responsive to a pressure wave, a fixed volume means, a conduit connecting the variable and fixed volume means, a movable member in said conduit responsive to fluid flow from the variable to the fixed volume means, circuit making and breaking apparatus connected ot the movable member, a second movable member in said conduit responsive to fluid flow from the fixed to the variable volume means, and a second circuit making and breaking apparatus connected to the second movable member.

4. In a pressure gradient detector device, a fluid reservoir, a second fluid reservoir, a conduit connecting said reservoirs, valve means controlling the opening of said conduit into the first fluid reservoir, a second valve means controlling the opening of the conduit into the second fluid reservoir, magnetic means for biasing the first valve means to a substantially closed position, a second magnetic means for biasing the second valve means to a substantially closed valve position, adjustable means for mounting the first magnetic means, adjustable means for mounting the second magnetic means, and a single adjustment means for controlling the sensitivity of the device, said last named means being drivably connected to both of said adjustable mounting means for moving the latter differentially by equal amounts.

5. In a pressure gradient detector device, a fluid reservoir, a second fluid reservoir, a conduit connecting said reservoirs, valve means controlling the opening of said conduit means into the first fluid reservoir, a second valve means controlling the opening of said conduit means into the second fluid reservoir, magnetic means for biasing the first valve means to a substantially closed valve position, a second magnetic means for biasing the second valve means to a substantially closed valve position, adjustable means for mounting the first magnetic means, adjustable means for mounting the second magnetic means, a single adjustment means drivably connected to both of said adjustable mounting means, a variable impedance means drivably connected to the single adjustment means, and a calibrating circuit including means for indicating at a distance the instant setting of said variable impedance means.

6. In a pressure gradient detector device, a fluid reservoir, a second fluid reservoir, a conduit connecting said reservoirs, valve means controlling the opening of said conduit means into the first fluid reservoir, a second valve means controlling the opening of said conduit into the second fluid reservoir, magnetic means for biasing the first valve means to a substantially closed valve position, a second magnetic means for biasing the second valve means to a substantially closed valve position, adjustable means for mounting the second magnetic means, a single adjustment means drivably connected to both of said adjustable mounting means, a reversible motor connected to said single adjustment means, and a dual circuit including means disposed at a distance for selectively energizing said motor to operate in either direction.

7. In a pressure gradient responsive device, a variable volume means responsive to a pressure wave, a fixed volume means, a conduit connecting the variable and fixed volume means, a movable member in said conduit responsive to fluid flow from the variable to the fixed volume means, circuit making and breaking apparatus connected to the movable member, an indicator circuit including said circuit making and breaking apparatus, a second movable member in said conduit responsive to fluid flow from the fixed to the variable volume means, a second circuit making and breaking apparatus connected to the second movable member, and a second indicator circuit including said second circuit making and breaking apparatus.

8. In a pressure gradient detector device, a circuit making and breaking apparatus comprising a pivotally mounted lever, a paramagnetic valve member on one end of the lever, a nozzle in registration with the valve member and adapted to be closed thereby in response to a predetermined rate of flow of fluid through the nozzle, means responsive to said pressure gradient for causing the flow of said fluid, a permanent magnet adjustably positioned in proximate spaced relation to said valve member for yieldably urging the valve member in an initial open position, and a pair of normally open contacts including a contact on said lever and adapted to be closed by the lever as the valve member moves from an initial open position to a closed position.

9. In a pressure gradient detector device, a fixed support, a lever, pivotal mounting means on the support for the lever, a fluid responsive valve member on one end of the lever, a nozzle in registration with the valve member, means responsive to said pressure gradient for causing the flow of said fluid through the nozzle, magnetically responsive biasing means comprising an adjustable permanent magnet positioned adjacent but spaced apart from the valve member, and additional biasing means comprising a resilient member interposed between the lever and the fixed support, said biasing means being adapted to hold the valve open until the rate of flow of said fluid has reached a predetermined value.

10. In a pressure gradient detector device, an adjustable support, mounting means on said support, a pair of parallel permanent magnets carried by the mounting means, the adjacent ends of said magnets being of opposite polarities, pivotal supporting means carried by the mounting means and spaced apart from said magnets, a bifurcated armature of paramagnetic material having its ends adjacent but spaced apart from one pair of ends of said magnets, a pivot secured to said armature along the axis thereof and maintained in engagement with the pivotal supporting means by said magnets, a movable valve disc having contact element and mounted on the armature, a combined nozzle having a fluid therein and a fixed contact element in registration with the movable valve disc and first named contact element, said valve and contact elements being adapted to be closed by a predetermined flow of said fluid, and means responsive to said pressure gradient for causing the flow of said fluid through the nozzle.

11. In a pressure gradient detector device, an adjustable support, mounting means on said support, a ball and socket joint between the mounting means and the support or adjusting the mounting means relative to the support, a pair of parallel permanent magnets carried by the mounting means, the adjacent ends of said magnets being of opposite polarities, pivotal supporting means carried by the mounting means and spaced apart from said magnets, a bifurcated armature of paramagnetic material having its ends adjacent but spaced apart from one pair of ends of said magnets, a pivot secured to said armature along the axis thereof and maintained in engagement with the pivotal supporting means by said magnets, a valve disc having a movable contact element and mounted on said armature, and a combined nozzle having a fluid therein and a fixed contact element in registration with the movable valve disc and first named contact element, said valve and contact elements being adapted to be closed by a flow of said fluid, and means responsive to said pressure gradient for causing the flow of said fluid through the nozzle.

12. A device for indicating the polarity of a pressure wave comprising, in combination, a variable volume means, a fixed volume means, each of said volume means having a quantity of fluid therein, conduit means interconnecting said variable and fixed volume means for providing a fluid connection therebetween, means including a pair of valve members arranged within said conduit means and adapted to be closed to break said fluid connection se'ectively in response to the direction of flow of the fluid therethrough due to positive and negative pressure waves respectively applied to said variable volume means, a pair of normally open circuit closing means individual to said valve members and adapted to be closed thereby as the valves individual thereto are closed, and a pair of pressure wave polarity indicators individual to said pair of circuit closing means and arranged to be operated selectively thereby as the circuit closing means individual thereto are closed.

13. A pressure polarity detector device comprising, in combination, a variable volume means responsive to a pressure wave, a fixed volume means, each of said volume means having a quantity of fluid therein, conduit means interconnecting said variable and fixed volume means for providing a fluid connection therebetween, means including a pair of valve members arranged within said conduit means and adapted to be closed to break said fluid connection selectively in response to the direction of flow of the liquid therethrough due to positive and negative pressure waves applied to said variable volume means, and a pair of circuit closing means individual to said valve members and adapted to be closed thereby as the valves individual thereto are closed.

References Cited in the file of this patent

UNITED STATES PATENTS

| | | |
|---|---|---|
| 1,233,199 | Fungo-Giera | July 10, 1917 |
| 1,950,301 | Hall et al. | Mar. 6, 1934 |
| 1,986,479 | Lowe et al. | Jan. 1, 1935 |
| 2,084,076 | Brown | June 15, 1937 |
| 2,173,370 | Parachek | Sept. 19, 1939 |

FOREIGN PATENTS

| | | |
|---|---|---|
| 29,891 | Denmark | June 27, 1922 |
| 524,085 | Great Britain | July 30, 1940 |